US010053598B2

(12) United States Patent
Yalcin et al.

(10) Patent No.: US 10,053,598 B2
(45) Date of Patent: Aug. 21, 2018

(54) SILOXANE-BASED PIPE COATINGS

(71) Applicant: 3M INNOVATIVE PROPERTIES COMPANY, St. Paul, MN (US)

(72) Inventors: Baris Yalcin, Woodbury, MN (US); Ibrahim S. Gunes, Minneapolis, MN (US); Audrey A. Sherman, Woodbury, MN (US); Robert W. Hunter, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 145 days.

(21) Appl. No.: 14/408,863

(22) PCT Filed: Jul. 1, 2013

(86) PCT No.: PCT/US2013/048846
§ 371 (c)(1),
(2) Date: Dec. 17, 2014

(87) PCT Pub. No.: WO2014/008148
PCT Pub. Date: Jan. 9, 2014

(65) Prior Publication Data
US 2015/0184023 A1   Jul. 2, 2015

Related U.S. Application Data

(60) Provisional application No. 61/667,625, filed on Jul. 3, 2012.

(51) Int. Cl.
*F16L 58/10* (2006.01)
*C09D 183/04* (2006.01)
*C09D 183/10* (2006.01)
*B05D 3/00* (2006.01)
*B29K 83/00* (2006.01)
*C08G 77/452* (2006.01)
*C08G 77/455* (2006.01)
*C08G 77/458* (2006.01)

(52) U.S. Cl.
CPC ........... *C09D 183/04* (2013.01); *B05D 3/007* (2013.01); *C09D 183/10* (2013.01); *F16L 58/1072* (2013.01); *B05D 2254/02* (2013.01); *B05D 2518/12* (2013.01); *B29K 2083/00* (2013.01); *C08G 77/452* (2013.01); *C08G 77/455* (2013.01); *C08G 77/458* (2013.01)

(58) Field of Classification Search
CPC .. F16K 58/1054; F16K 58/1072; F16K 58/10; B05D 2254/02; B05D 2518/12; C08G 77/452; C08G 77/455; C08G 77/458; C09D 183/04; C09D 183/10
USPC .......... 428/36.91, 36.9, 35.7, 343, 354, 344, 428/352, 347; 528/25, 26, 28, 38; 525/102, 420, 425, 431
See application file for complete search history.

(56) References Cited

U.S. PATENT DOCUMENTS

| | | | |
|---|---|---|---|
| 2,978,340 A | 4/1961 | Veatch | |
| 3,030,215 A | 4/1962 | Veatch | |
| 3,129,086 A | 4/1964 | Veatch | |
| 3,230,064 A | 1/1966 | Veatch | |
| 3,365,315 A | 1/1968 | Beck | |
| 3,923,705 A * | 12/1975 | Smith | .................... C08L 83/04 260/DIG. 24 |
| 4,391,646 A | 7/1983 | Howell | |
| 4,767,726 A | 8/1988 | Marshall | |
| 4,900,474 A | 2/1990 | Terae | |
| 5,028,679 A | 7/1991 | Terae | |
| 5,118,775 A | 6/1992 | Inomata | |
| 5,214,119 A | 5/1993 | Leir | |
| 5,236,997 A | 8/1993 | Fujiki | |
| 5,461,134 A | 10/1995 | Leir | |
| 5,512,650 A | 4/1996 | Leir | |
| 5,571,625 A | 11/1996 | Porte | |
| 5,607,721 A | 4/1997 | Ulman | |
| 5,894,042 A | 4/1999 | Ferralli | |
| 6,746,761 B2 | 6/2004 | Janoff | |
| 6,846,893 B1 | 1/2005 | Sherman | |
| 7,153,924 B2 | 12/2006 | Kuepfer | |
| 7,947,376 B2 | 5/2011 | Sherman | |
| 2002/0106501 A1 | 8/2002 | Debe | |
| 2003/0175497 A1* | 9/2003 | Kobe | .................... C09J 7/0289 428/317.9 |
| 2006/0118194 A1* | 6/2006 | Mechler | ............... F15B 15/1428 138/125 |
| 2006/0122049 A1 | 6/2006 | Marshall | |
| 2007/0148475 A1 | 6/2007 | Sherman | |
| 2008/0199620 A1* | 8/2008 | Sherman | ................. C08G 69/42 427/372.2 |
| 2009/0159146 A1 | 6/2009 | Jackson | |
| 2010/0043906 A1 | 2/2010 | Jackson | |
| 2010/0126618 A1 | 5/2010 | D'Souza | |
| 2010/0154916 A1 | 6/2010 | Jackson | |
| 2011/0071268 A1* | 3/2011 | Hays | .................... C08G 77/455 528/26 |
| 2011/0092638 A1 | 4/2011 | Leir | |
| 2011/0189421 A1 | 8/2011 | Sherman | |
| 2011/0244159 A1 | 10/2011 | Papp | |
| 2011/0274863 A1* | 11/2011 | Busch | .................... C09D 5/185 428/41.7 |

FOREIGN PATENT DOCUMENTS

| | | |
|---|---|---|
| WO | WO 1996-34028 | 10/1996 |
| WO | WO 1996-34030 | 10/1996 |

(Continued)

OTHER PUBLICATIONS

International Search Report for PCT International Application No. PCT/US2013/048846, dated Aug. 27, 2013, 4pgs.

*Primary Examiner* — Lee S Sanderson
(74) *Attorney, Agent, or Firm* — Janet A. Kling

(57) ABSTRACT

Siloxane-based pipe coatings include a hot melt processable siloxane-based elastomeric polymer, and may optionally contain fillers and additives. The siloxane-based elastomeric polymer is a urea-containing segmented copolymer or an oxamide-containing segmented copolymer. The coatings are substantially free of tackifying resins and are non-tacky and non-adhesive until heated to a temperature of at least 50 C.

6 Claims, No Drawings

(56) References Cited

FOREIGN PATENT DOCUMENTS

| WO | WO 1996-35458 | 11/1996 | | |
|---|---|---|---|---|
| WO | WO 1997-40103 | 10/1997 | | |
| WO | WO 1998-17726 | 4/1998 | | |
| WO | WO 2007-140008 | 12/2007 | | |
| WO | WO 2010-050366 | 5/2010 | | |
| WO | WO 2011034839 A2 * | 3/2011 | ............ | C08G 69/00 |
| WO | WO 2011-090644 | 7/2011 | | |

\* cited by examiner

SILOXANE-BASED PIPE COATINGS

CROSS REFERENCE TO RELATED APPLICATIONS

This application is a national stage filing under 35 U.S.C. 371 of PCT/US2013/048846, filed Jul. 1, 2013, which claims priority to U.S. Provisional Application No. 61/667,625, filed Jul. 3, 2012, the disclosure of which is incorporated by reference in its/their entirety herein.

FIELD OF THE DISCLOSURE

The present disclosure relates to pipe coatings prepared from siloxane-based materials.

BACKGROUND

Insulation and insulating coatings are used to protect and thermally insulate a wide variety of pipelines and flowlines. The increased demand for the production and delivery of energy requires the deployment of pipelines and flowlines in increasingly demanding environments. An example of a demanding environment is underwater, especially underwater in a saltwater environment.

A variety of insulating coatings have been developed for pipelines. The US Patent Publication Nos. 2010/0154916, 2009/0159146, and 2010/043906 to Jackson et al. describe insulating pipe coatings. US Patent Publication No. 2010/0154916 describes a wrapable, styrenic thermal insulation product for application to a pipe in the form of an elongate tape. US Patent Publication No. 2009/0159146 describes coatings for protecting and insulating pipelines, with at least one layer comprising polystyrene or a styrene-based thermoplastic. US Patent Publication No. 2010/043906 describes a polymeric composition for insulating pipelines, with at least one layer comprising a high temperature resistant thermoplastic selected from one or more members of the group comprising: polycarbonate; polyphenylene oxide; polyphenylene oxide blended with polypropylene, polystyrene or polyamide; polycarbonate blended with polybutylene terephthalate, polyethylene terephthalate, acrylonitrile butadiene styrene, acrylonitrile styrene acrylate, or polyetherimide; polyamides, including polyamide 12 and 612 and elastomers thereof; polymethylpentene and blends thereof; cyclic olefin copolymers and blends thereof; and, partially crosslinked thermoplastic elastomers, also known as thermoplastic vulcanizates or dynamically vulcanized elastomers.

US Patent Publication No. 2010/0126618 (D'Souza et al.) describes insulated articles having a first insulation region comprising a first polymeric material and first hollow ceramic microspheres and a second insulation region comprising a second polymeric material and second hollow ceramic microspheres.

SUMMARY

Disclosed herein are coated pipes with siloxane-based pipe coatings and methods for preparing coated pipes with siloxane-based pipe coatings.

In some embodiments, the coated pipe comprises: a pipe comprising an interior surface and an exterior surface, and a coating in contact with the exterior surface of the pipe. The coating comprises: a hot melt processable siloxane-based elastomeric polymer, and may optionally contain fillers and other additives. The siloxane-based elastomeric polymer comprises a segmented copolymer of Formula 1 or Formula 2. Formula 1 has the following segmented structure:

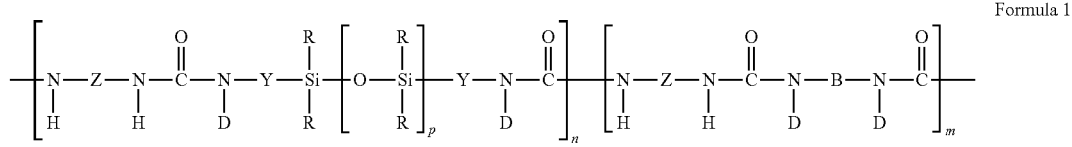

Formula 1 wherein each R is a moiety that, independently, is an alkyl moiety, having about 1 to 12 carbon atoms, and may be substituted with, for example, trifluoroalkyl or vinyl groups, a vinyl radical or a higher alkenyl radical, a cycloalkyl moiety having from about 6 to 12 carbon atoms and may be substituted with alkyl, fluoroalkyl, and vinyl groups, or an aryl moiety having from about 6 to 20 carbon atoms and may be substituted; each Z is a polyvalent radical that is an arylene radical or an aralkylene radical having from about 6 to 20 carbon atoms, an alkylene or cycloalkylene radical having from about 6 to 20 carbon atoms; each Y is a polyvalent radical that independently is an alkylene radical of 1 to 10 carbon atoms, an aralkylene radical or an arylene radical having 6 to 20 carbon atoms; each D is selected from the group consisting of hydrogen, an alkyl radical of 1 to 10 carbon atoms, phenyl, and a radical that completes a ring structure including B or Y to form a heterocycle; where B is a polyvalent radical selected from the group consisting of alkylene, aralkylene, cycloalkylene, phenylene, heteroalkylene, and copolymers and mixtures thereof; m is a number that is 0 to about 1000; n is a number that is at least 1; and p is a number that is at least 10, in some embodiments 15 to about 2000, or even 30 to 1500.

Formula 2 has the following segmented structure:

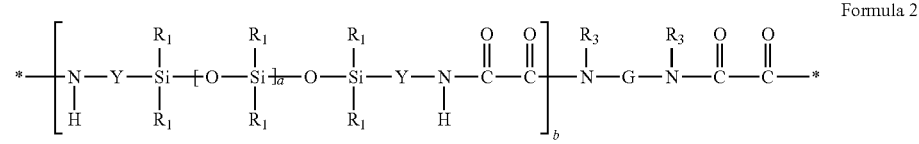

Formula 2 wherein each $R_1$ is independently an alkyl, haloalkyl, aralkyl, alkenyl, aryl, or aryl substituted with an alkyl, alkoxy, or halo; each Y is independently an alkylene, aralkylene, or a combination thereof; subscript a is independently an integer of 40 to 1500; subscript b is an integer of 1 to 10; G is a divalent group that is the residue unit that is equal to a diamine of formula $R_3HN$-G-$NHR_3$ minus the two —$NHR_3$ groups; each $R_3$ is hydrogen or an alkyl having 1 to 10 carbon atoms, or $R_3$ taken together with G and with the nitrogen to which they are both attached forms a heterocyclic group; each asterisk (*) indicates a site of attachment of the repeat unit to another group in the copolymer.

The coating is non-tacky and non-adhesive to polar substrates at a temperature of less than 50° C. and is adhesive to polar substrates at a temperature of greater than 50° C. up to a temperature of 10° C. below the decomposition temperature of the siloxane-based elastomeric polymer. The coating is substantially free of tackifying resin and in some embodiments, the coating is optically transparent. In some embodiments, the coating is a multi-layer coating with the at least one of the layers of the multi-layer coating comprising a hot melt processable siloxane-based elastomeric polymer.

Also disclosed are methods for coating a pipe. In one embodiment, the method for coating a pipe, comprises: providing a pipe with an interior surface and an exterior surface; providing a coating material, wherein the coating material comprises a hot melt processable siloxane-based elastomeric polymer as described above; adding the coating material to a hot melt dispensing apparatus; hot melt coating the coating material onto the exterior surface of the pipe; and cooling the hot melt coating to provide a first coating layer on the pipe.

As described above, the coating material is substantially free of tackifying resin, and the coating material may further comprise at least one filler or other additive material. In some embodiments the filler or other additive material comprises polypropylene, glass bubbles, or a combination thereof.

In some embodiments, the method further comprises applying at least one additional hot melt processable coating to the pipe, wherein the at least one additional hot melt processable coating is in contact with the first coating layer. The at least one additional hot melt processable coating may be the same as the first coating layer or different.

Another method of coating a pipe comprises preparing a layer of coating material on a carrier sheet such as a release liner, disposing this layer on a pipe surface, and heating the layer of coating material to form a first coating layer.

DETAILED DESCRIPTION

Insulating coatings for pipelines and flowlines are needed that are able to provide insulation under a wide range of conditions, are resistant to demanding environments such as underwater in a saltwater environment, and yet are easy to apply to pipes and are economical for use on a large scale.

An example of a pipeline coating material that has been used is syntactic foam. Syntactic foams containing hollow inorganic microspheres, typically glass or ceramic microspheres, are used for insulation in a variety of applications due in part to their low thermal conductivities. For example, syntactic foams are used in wet insulation applications (i.e., insulation that is exposed to sea water) for off-shore oil pipelines or flowlines. In these pipelines or flowlines, the temperature of the surrounding water can be less than 10° C., which can lead to extensive heat loss from the oil present in the pipe. Such heat loss can result in a reduction of the flow of oil due to an increase in viscosity of the oil and/or precipitation of paraffins and/or asphaltenes present in the oil. Some wet insulation systems combine unfilled polymer layers with syntactic foam layers in order to maintain the temperature of the oil in the pipelines or flowlines as close to the production temperature as possible. However, unfilled polymer layers typically exhibit higher volume shrinkage and/or have higher coefficients of thermal expansion than typical syntactic foams, which could cause stresses within or between the insulation layers. One solution to the problem of shrinkage in an unfilled polypropylene insulation layer is to add solid glass beads to the polypropylene; however, this composition tends to have excessive thermal conductivity. Thus there remains a need for alternative insulation systems to meet the demands of severe environments, (e.g., off-shore oil pipelines or flowlines).

The present disclosure describes coated pipes and methods for coating pipes. The coatings comprise a hot melt processable siloxane-based elastomeric polymer. The coating may comprise a multi-layer coating and the coating may additionally comprise one or more fillers.

The siloxane-based coatings of this disclosure have a variety of desirable features. Because siloxanes are naturally hydrophobic, coatings comprising siloxanes have a desirable resistance to water penetration. Additionally, since the siloxane surface is naturally a low energy surface, the surface is resistant to a wide range of fouling agents including dirt, mud, salt residue, etc as well as microbes and other living organisms. The siloxane-based elastomeric polymers of this disclosure can also be optically clear and thus can give coatings that are optically transparent. This transparency can be useful, for example, to determine if there is corrosion, cracking, or other surface issues with the coated pipe.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "siloxane-based" as used herein refers to repeat units, to segmented copolymers or units of segmented copolymers that contain at least one silicone unit. The terms silicone or siloxane are used interchangeably and refer to units with dialkyl or diaryl siloxane (—$SiR_2O$—) repeating units.

The term "urea-containing" as used herein refers to macromolecules that are segmented copolymers which contain at least one urea linkage. The urea group has the general structure (—$R^aN$—(CO)—$NR^b$—) where (CO) defines a carbonyl group C═O, and each $R^a$ and $R^b$ is independently a hydrogen or an alkyl group.

The term "oxamide-containing" as used herein refers to macromolecules that are copolymers or segmented copolymers which contain at least one oxamide linkage. The oxamide group has the general structure (—$NR^a$—(CO)—

(CO)—NR$^b$—) where (CO) defines a carbonyl group C=O, and R$^a$ and R$^b$ are each hydrogen or an alkyl group.

The term "segmented copolymer" refers to a copolymer of linked segments, each segment constitutes primarily a single structural unit or type of repeating unit. For example, a polyoxyalkylene segmented copolymer may have the following structure:

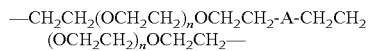
    (OCH$_2$CH$_2$)$_n$OCH$_2$CH$_2$— where A is the linkage between the 2 polyoxyalkylene segments, or it may have the following structure:

—CH$_2$CH$_2$(OCH$_2$CH$_2$)$_n$OCH$_2$CH$_2$-A-B— where A is the linkage between the polyoxyalkylene segment and the B segment.

Heat-activatable adhesives (sometimes called "heat activated adhesives") are non-tacky at room temperature but become tacky and capable of bonding to a substrate at elevated temperatures. These adhesives usually have a Tg (glass transition temperature) or melting point (Tm) above room temperature. When the temperature is elevated above the Tg or Tm, the storage modulus usually decreases and the adhesive becomes tacky. Typically glass transition temperature (Tg) is measured using Differentially Scanning calorimetry (DSC).

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example,

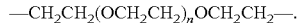

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —R$^a$—Ar$^a$— where R$^a$ is an alkylene and Ar$^a$ is an arylene (i.e., an alkylene is bonded to an arylene).

Unless otherwise indicated, "optically transparent" refers to an article, coating, or layer that has a high light transmittance over at least a portion of the visible light spectrum (about 400 to about 700 nm). The term "transparent coating" refers to a coating having a thickness and when the coating is disposed on a substrate, an image (disposed on or adjacent to the substrate) is visible through the thickness of the transparent coating. In many embodiments, a transparent coating allows the image to be seen through the thickness of the coating without substantial loss of image clarity.

Unless otherwise indicated, "optically clear" refers to an material or layer that has a high light transmittance over at least a portion of the visible light spectrum (about 400 to about 700 nm), and that exhibits low haze.

Disclosed herein are coated pipe articles. These articles comprise a pipe, and a coating in contact with the exterior surface of the pipe, the coating comprising a hot melt processable siloxane-based elastomeric polymer. The coating may be a multi-layer coating and the coating may additionally comprise one or more fillers or other additives.

A wide variety of pipes may be coated with the pipe coatings of this disclosure including pipes that are prepared from metals and polymers. Metal pipes are particularly useful, and the hot melt processable siloxane-based elastomeric polymers of the pipe coatings form strong bonds to metallic surfaces, especially when applied at elevated temperatures. The metal pipes may also contain a variety of different surface coatings or layers. These surface coatings or layers may include, for example, paint layers, or anti-corrosion layers. Many anti-corrosion layers are epoxy-based layers. The pipes may have a wide range of diameters from very narrow pipes to very wide diameter pipes such as used in industrial applications.

The pipe comprises a coating on the exterior surface of the pipe. This coating comprises a hot melt processable siloxane-based elastomeric polymer. The coating may comprise only the hot melt processable siloxane-based elastomeric polymer, it may comprise the hot melt processable siloxane-based elastomeric polymer in combination with one or more fillers and other additives, or it may comprise a multi-layer coating in which at least one of the layers comprises a hot melt processable siloxane-based elastomeric polymer. Each of these types of coatings will be described in further detail below.

The pipe coating comprises a hot melt processable siloxane-based elastomeric polymer. Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Particularly suitable elastomeric siloxane-based elastomeric polymers are the segmented polymers of Formula 1 and Formula 2 below.

The elastomeric siloxane polymers of Formula 1 are an example of a useful class of silicone elastomeric polymers. Formula 1 shows urea-containing silicone polymers such as silicone polyurea block copolymers. Silicone polyurea block copolymers include the reaction product of a polydiorganosiloxane diamine (also referred to as a silicone diamine), a diisocyanate, and optionally an organic polyamine. Suitable silicone polyurea block copolymers are represented by the repeating unit of Formula 1:

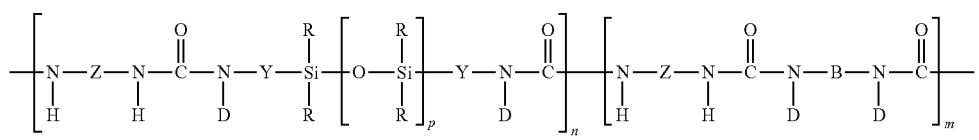

Formula 1 wherein
each R is a moiety that, independently, is an alkyl moiety, having about 1 to 12 carbon atoms, and may be substituted with, for example, trifluoroalkyl or vinyl groups, a vinyl radical or a higher alkenyl radical, a cycloalkyl moiety having from about 6 to 12 carbon atoms and may be substituted with alkyl, fluoroalkyl, and vinyl groups, or an aryl moiety having from about 6 to 20 carbon atoms and may be substituted with, for example, alkyl, cycloalkyl, fluoroalkyl and vinyl groups or R is a perfluoroalkyl group as described in U.S. Pat. No. 5,028,679, or a fluorine-containing group, as described in U.S. Pat. No. 5,236,997, or a perfluoroether-containing group, as described in U.S. Pat. Nos. 4,900,474 and 5,118,775; typically, at least 50% of the R moieties are methyl radicals with the balance being monovalent alkyl or substituted alkyl radicals having from 1 to 12 carbon atoms, alkenyl radicals, phenyl radicals, or substituted phenyl radicals;

each Z is a polyvalent radical that is an arylene radical or an aralkylene radical having from about 6 to 20 carbon atoms, an alkylene or cycloalkylene radical having from about 6 to 20 carbon atoms, in some embodiments Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;

each Y is a polyvalent radical that independently is an alkylene radical of 1 to 10 carbon atoms, an aralkylene radical or an arylene radical having 6 to 20 carbon atoms;

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, heteroalkylene, including for example, polyethylene oxide, polypropylene oxide, polytetramethylene oxide, and copolymers and mixtures thereof;

m is a number that is 0 to about 1000;

n is a number that is at least 1; and p is a number that is at least 10, in some embodiments 15 to about 2000, or even 30 to 1500.

Useful silicone polyurea block copolymers are disclosed in, e.g., U.S. Pat. Nos. 5,512,650, 5,214,119, 5,461,134, and 7,153,924 and PCT Publication Nos. WO 96/35458, WO 98/17726, WO 96/34028, WO 96/34030 and WO 97/40103.

Another useful class of elastomeric siloxane polymers are oxamide-containing polymers such as polydiorganosiloxane polyoxamide block copolymers. Examples of polydiorganosiloxane polyoxamide block copolymers are presented, for example, in US Patent Publication No. 2007-0148475. The polydiorganosiloxane polyoxamide block copolymer contains at least two repeat units of Formula 2.

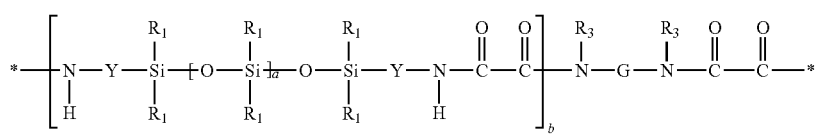

Formula 2

In this formula, each $R_1$ is independently an alkyl, haloalkyl, aralkyl, alkenyl, aryl, or aryl substituted with an alkyl, alkoxy, or halo, wherein at least 50 percent of the $R_1$ groups are methyl. Each Y is independently an alkylene, aralkylene, or a combination thereof. Subscript a is independently an integer of 40 to 1500 and the subscript b is an integer of 1 to 10. Group G is a divalent group that is the residue unit that is equal to a diamine of formula $R_3HN$-$G$-$NHR_3$ minus the two —$NHR_3$ groups. Group $R_3$ is hydrogen or alkyl (e.g., an alkyl having 1 to 10, 1 to 6, or 1 to 4 carbon atoms) or $R_3$ taken together with G and with the nitrogen to which they are both attached forms a heterocyclic group (e.g., $R_3HN$-$G$-$NHR_3$ is piperazine or the like). Each asterisk (*) indicates a site of attachment of the repeat unit to another group in the copolymer such as, for example, another repeat unit of Formula 2.

Suitable alkyl groups for $R_1$ in Formula 2 typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R_1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R_1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R_1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R_1$ usually have an alkylene group having 1 to 10 carbon atoms and an aryl group having 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

At least 50 percent of the $R_1$ groups are methyl. For example, at least 60 percent, at least 70 percent, at least 80 percent, at least 90 percent, at least 95 percent, at least 98 percent, or at least 99 percent of the $R_1$ groups can be methyl. The remaining $R_1$ groups can be selected from an alkyl having at least two carbon atoms, haloalkyl, aralkyl, alkenyl, aryl, or aryl substituted with an alkyl, alkoxy, or halo.

Each Y in Formula 2 is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group having 6 to 12 carbon atoms bonded to an alkylene group having 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript a in Formula 2 is independently an integer of 40 to 1500. For example, subscript a can be an integer up to 1000, up to 500, up to 400, up to 300, up to 200, up to 100, up to 80, or up to 60. The value of a is often at least 40, at least 45, at least 50, or at least 55. For example, subscript a can be in the range of 40 to 1000, 40 to 500, 50 to 500, 50 to 400, 50 to 300, 50 to 200, 50 to 100, 50 to 80, or 50 to 60.

The subscript b is an integer of 1 to 10. For example, the value of b is often an integer up to 9, up to 8, up to 7, up to 6, up to 5, up to 4, up to 3, or up to 2. The value of b can be in the range of 1 to 8, 1 to 6, or 1 to 4.

Group G in Formula 2 is a residual unit that is equal to a diamine compound of formula $R_3HN$-G-$NHR_3$ minus the two amino groups (i.e., $-NHR_3$ groups). Group $R_3$ is hydrogen or alkyl (e.g., an alkyl having 1 to 10, 1 to 6, or 1 to 4 carbon atoms) or $R_3$ taken together with G and with the nitrogen to which they are both attached forms a heterocyclic group (e.g., $R_3HN$-G-$NHR_3$ is piperazine). The diamine can have primary or secondary amino groups. In most embodiments, $R_3$ is hydrogen or an alkyl. In many embodiments, both of the amino groups of the diamine are primary amino groups (i.e., both $R_3$ groups are hydrogen) and the diamine is of formula $H_2N$-G-$NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

The polydiorganosiloxane polyoxamide tends to be free of groups having a general formula $-R^a-(CO)-NH-$ where $R^a$ is an alkylene. All of the carbonylamino groups along the backbone of the copolymeric material are part of an oxalylamino group (i.e., the group with the general structure $-(CO)-(CO)-NH-$). That is, any carbonyl group along the backbone of the copolymeric material is bonded to another carbonyl group and is part of an oxalyl group. More specifically, the polydiorganosiloxane polyoxamide has a plurality of aminoxalylamino groups.

An advantage of these hot melt processable siloxane-based elastomeric polymers is that they have the properties of heat-activatable adhesives. As mentioned above heat-activatable adhesives are ones that have the property of not being tacky or have low tack at room temperature but become tacky upon heating and therefore can form strong adhesive bonds upon heating. Heat-activatable adhesives are different from conventional hot melt adhesives that typically are, or behave as, thermoplastic materials. Thermoplastic materials are plastics at room temperature, and upon heating they melt and flow, and then re-condense upon cooling to re-form the plastic. Often these hot melt adhesives contain crystalline or semicrystalline polymers. The crystallinity of the polymers gives them cohesive strength at room temperature, but upon melting of the crystallinity, the polymers lose their cohesive strength and readily flow. The heat-activatable adhesives of this disclosure, while hot melt processable, are elastomeric and retain at least some of their cohesive strength upon heating.

Siloxane-based elastomeric polymers have been used as pressure sensitive adhesives. Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. Typically the siloxane-based elastomeric polymers require tackification to make them pressure sensitive adhesives. Often the levels of added tackifying agent are relatively high, up to 50% by weight of the total adhesive composition (or expressed another way the pressure sensitive adhesive composition can contain equal parts by weight of elastomer and tackifying agent).

The hot melt processable siloxane-based elastomeric polymers of this disclosure, because they are heat-activatable adhesives, do not require tackification. This means that the coatings of this disclosure are typically free or substantially free of tackifying resin. While tackifying resin can be added to the coating as an optional additive as will be described below, the coatings of this disclosure do not require tackifying resins to produce strong adhesion between the pipe surface and the coating.

Coatings comprising hot melt processable siloxane-based elastomeric polymers, while non-tacky at room temperature are heat-activatable and form strong adhesive bonds to polar substrates such as metals upon heating. Generally the coatings are non-tacky and non-adhesive to polar substrates such as metals at a temperature of less than 50° C. Typically strong adhesive bonds are formed upon heating at a temperature of greater than 50° C. up to a temperature of 10° C. below the decomposition of the siloxane-based elastomeric polymer.

An additional advantage of the hot melt processable siloxane-based elastomeric polymers is that many of them are optically clear. Coatings made from these polymers may be optically clear or optically transparent. Since the coatings may comprise fillers or additives that can interfere with the transmission of visible light, the coatings are often not as optically clear as the hot melt processable siloxane-based elastomeric polymers, but may be optically transparent. This transparency may be useful to monitor the condition of the surface of the pipe, i.e. to check it for corrosion or cracks or other surface irregularities.

Yet another advantage of coatings comprising hot melt processable siloxane-based elastomeric polymers is their hydrophobicity. This can be particularly important if the pipe is to be used underwater or in damp environments. Moisture penetration of the pipe coating can lead to corrosion of the pipe. The use of hydrophobic siloxane-based polymers can help to prevent moisture penetration of the coating.

As mentioned above, the coating may comprise only the hot melt processable siloxane-based elastomeric polymers of this disclosure. However, because these elastomeric polymers are relatively expensive and the coatings are often quite thick, it is often desirable for the coating to comprise one or more fillers or other additives. A wide range of polymeric and particulate materials may be used as long as they form a suitable coating when mixed with the hot melt processable siloxane-based elastomeric polymers of this disclosure. These fillers can be used to make the coatings thicker, less expensive, and better insulators.

In some embodiments, the filler or other additive comprises a polymeric material. In other embodiments, the filler or other additive comprises particles such as glass bubbles, hollow ceramic microspheres, and the like. In many embodiments, the filler comprises a combination of a polymeric material and particles.

A wide range of polymeric materials are suitable as fillers or additives for the coatings of this disclosure. Examples of suitable polymeric materials useful and additives for coatings of this disclosure include thermoplastics and thermoplastic elastomers. Exemplary thermoplastics include polyolefins (e.g., polypropylene, polyethylene); fluorinated polyolefins (e.g., polytetrafluoroethylene, copolymers of tetrafluoroethylene and hexafloropropylene (FEP), perfluoroalkoxy polymer resin (PFA), polychlorotrifluoroethylene (pCTFE), copolymers of ethylene and chlorotrifluoroethylene (pECTFE), and copolymers of ethylene and tetrafluoroethylene (PETFE)); polyamide, polyamide-imide, polyether-imide, polyetherketone resins, and blends of two or more such resins.

In some embodiments, the polymeric material is a thermoplastic elastomer. Examples of thermoplastic elastomers include block copolymers of the A-B-A and (AB-)$_n$ type. Typically the A block is a thermoplastic material such as polystyrene and the B block is an elastomeric material such as polyisoprene. At room temperature the A blocks tend to coalesce to form microdomains that provide physical cross-linking to the polymers, but upon heating these microdomains melt and the polymer behaves like a thermoplastic. Upon cooling, the microdomains re-form. Examples of thermoplastic materials include the block copolymers available from Kraton Polymers, Houston, Tex. under the trade name "KRATON".

Polyolefin thermoplastics are generally suitable polymeric materials for use as fillers or additives for the coatings of this disclosure. In some embodiments, the polymeric material comprises at least one of polypropylene or polyethylene. For cost and other reasons, polypropylene is a particularly suitable polymeric material for use in the coatings of this disclosure.

A wide range of particulate filler materials are suitable for use in the coatings of this disclosure. Particularly suitable particles include glass bubbles, hollow ceramic microspheres, and the like. Typically, the particulate filler, if used, is present in the coating at a level of at least 10% by volume.

Examples of suitable glass bubble materials include glass microbubbles. Glass microbubbles are known in the art and can be obtained commercially and/or be made by techniques known in the art (see, e.g., U.S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); U.S. Pat. No. 4,391,646 (Howell); and U.S. Pat. No. 4,767,726 (Marshall); and U.S. Pat. App. Pub. No. 2006/0122049 (Marshall et. al), which are incorporated herein by reference for their disclosure of silicate glass compositions and methods of making glass microbubbles). Glass microbubbles may have, for example, a chemical composition wherein at least 90%, 94%, or even 97% of the glass consists essentially of at least 67% $SiO_2$, (e.g., a range of 70% to 80% $SiO_2$), a range of 8% to 15% CaO, a range of 3% to 8% $Na_2O$, a range of 2% to 6% $B_2O_3$, and a range of 0.125% to 1.5% $SO_3$.

When preparing glass microbubbles according to methods known in the art (e.g., by crushing frit and heating the resulting particles to form microbubbles), the amount of sulfur in the glass particles (i.e., feed) and the amount and length of heating to which the particles are exposed (e.g., the rate at which particles are fed through a flame) can typically be adjusted to provide glass microbubbles of a selected density. Lower amounts of sulfur in the feed and faster heating rates lead to higher density bubbles as described in U.S. Pat. No. 4,391,646 (Howell) and U.S. Pat. No. 4,767,726 (Marshall).

Useful commercially available glass microbubbles include: those available from Potters Industries, Valley Forge, Pa., (an affiliate of PQ Corporation) under the trade designation "SPHERICEL HOLLOW GLASS SPHERES" (e.g., grades 110P8 and 60P18), and glass bubbles marketed by 3M Company, St. Paul, Minn., under the trade designation "3M GLASS BUBBLES" (e.g., grades S35, S38, S38HS, S38XHS, S42XHS, D32/4500, iM30K, XLD 3000, XLD 6000, XLD iM17K, and H50/10000).

Examples of suitable hollow ceramic microspheres include aluminosilicate microspheres extracted from pulverized fuel ash collected from coal-fired power stations (i.e., cenospheres). As is known in the art, care should be taken with their use in hot melt processing equipment. Examples of cenospheres include those available from Sphere One, Inc., Chattanooga, Tenn., under the trade designation "EXTENDOSPHERES HOLLOW SPHERES" (e.g., grades SG, MG, CG, TG, HA, SLG, SL-150, 300/600, 350, XOL-200, XOL-150 and FM-1); and those marketed by 3M Company under the trade designation "3M HOLLOW CERAMIC MICROSPHERES" (e.g., grades G-3125, G-3150, and G-3500). Cenospheres typically have true average densities in a range from 0.7 g/cm$^3$ to 0.8 g/cm$^3$.

The mean particle size of the microsphere filler materials may be, for example, in a range from 5 to 250 micrometers (in some embodiments from 10 to 110 micrometers, from 10 to 70 micrometers, or even from 20 to 40 micrometers). The microspheres may have a multimodal (e.g., bimodal or trimodal) size distribution (e.g., to improve packing efficiency) as described, for example, in U.S. Patent Publication No. 2002/0106501 (Debe).

It may also be desirable to use a mix of filler particles. For example, glass bubble filler particles can be mixed with hollow ceramic microspheres in the coating.

As stated above, the coatings of this disclosure may comprise a multi-layer coating in which at least one of the layers comprises a hot melt processable siloxane-based elastomeric polymer. This layer may comprise only the hot melt processable siloxane-based elastomeric polymer or it may comprise the hot melt processable siloxane-based elastomeric polymer in combination with one or more fillers and other additives.

A wide range of multi-layer coatings are suitable pipe coatings. In some embodiments, a relatively thin layer of the hot melt processable siloxane-based elastomeric polymer, or the hot melt processable siloxane-based elastomeric polymer in combination with one or more fillers and other additives, can be coated onto the pipe surface. This coating can be viewed as a type of "primer layer". Primers are well understood coatings applied to surfaces to change their surface chemistry to make the surface more readily bonded by subsequent coatings or layers. In this instance, since hot melt processable siloxane-based elastomeric polymer acts as a heat-activatable adhesive that forms strong bonds to metals and other polar surfaces, application of a relatively thin coating of the hot melt processable siloxane-based elastomeric polymer in the molten state produces, upon cooling, a strongly bonded polymer layer. To this layer can be applied a wide variety of additional coating layers to build up the thickness of the pipe coating. These additional coatings may also comprise the hot melt processable siloxane-based elastomeric polymer, they may comprise the hot melt processable siloxane-based elastomeric polymer in combination with one or more fillers and other additives, or they may comprise other materials. In some embodiments, the multi-layer pipe coating comprises a layer of the hot melt processable siloxane-based elastomeric polymer in contact with the pipe surface, and at least one additional layer comprising hot melt processable siloxane-based elastomeric polymer in combination with at least one filler or additive. In other embodiments, the multi-layer coating comprises a layer comprising the hot melt processable siloxane-based elastomeric polymer and at least one filler material in contact with the pipe surface. Examples of suitable fillers and additives are described above.

There are a number of circumstances that might make the use of multi-layer pipe coatings desirable. For example, all of the layers of the pipe coating may not be applied at the same time or place. An initial layer comprising the hot melt processable siloxane-based elastomeric polymer may be applied at one location and additional layers applied later at a different facility. This can be useful if the same pipe may be used for a variety of different applications requiring different pipe coatings. For example, if the same pipe might be used in an underwater or in an underground setting, different pipe coatings might be applied. If the pipe is coated with a layer of the hot melt processable siloxane-based elastomeric polymer, subsequent coatings can be applied as needed. In this way, the advantageous strong bonding of the hot melt processable siloxane-based elastomeric polymer to the metal surface provides a polymeric surface for applying the subsequent layers instead of a metal surface. Also, since the hot melt processable siloxane-based elastomeric polymer behaves as a heat-activatable adhesive, if the layer is heated or the subsequent layers are applied hot, the adhesion to these layers is enhanced.

Another reason for preparing a multi-layer pipe coating using a relatively thin layer of the hot melt processable siloxane-based elastomeric polymer as a "primer layer" is economic. As stated previously, the hot melt processable siloxane-based elastomeric polymer materials can be relatively expensive, so using relatively thin layers of the hot melt processable siloxane-based elastomeric polymer can take advantage of the useful properties of these materials in an economic manner.

Other examples of multi-layer pipe coatings could include concentric coating layers comprising the hot melt processable siloxane-based elastomeric polymer and increasing amounts of fillers and additives. In this way the layers closest to the pipe surface have the highest concentration of the hot melt processable siloxane-based elastomeric polymer for strong adhesion, with each subsequent layer being less and less expensive. If desired, the multi-layer coating can have an exterior surface layer that is free of fillers and additives. This exterior surface layer could be the hot melt processable siloxane-based elastomeric polymer or it could a different material, such as a polyolefin layer for example.

Depending upon the desired use of the pipe, as well as a variety of other factors, the pipe coating may have a wide range of thicknesses. For single layer coatings, if the coating comprises only the hot melt processable siloxane-based elastomeric polymer, it may be relatively thin. In some embodiments, the coating may be in the range of 100 micrometers thick to 10 millimeters thick. In some embodiments, the coating has a thickness of up to 200 micrometers, 500 micrometers, 1 millimeter, 2 millimeters, 5 millimeters, or 8 millimeters. If the single layer coating comprises the hot melt processable siloxane-based elastomeric polymer in combination with one or more fillers and other additives, the coating may be in the range of 100 micrometers thick to 10 centimeters thick. In some embodiments, the coating has a thickness of up to 200 micrometers, 500 micrometers, 1 millimeter, 2 millimeters, 5 millimeters, 8 millimeters, 10 millimeters, 3 centimeters (1 inch), 5 centimeters (2 inches), 8 centimeters (3 inches), 9 centimeters (3.5 inches), or 10 centimeters (4 inches).

In multi-layer coatings, even greater variation is possible. If a relatively thin layer of the hot melt processable siloxane-based elastomeric polymer is used as a primer layer, this layer may be in the range of 100 micrometers thick to 1 millimeter thick. Subsequent layers can be of any suitable thickness. Typically multi-layer coatings are in the range of 1 millimeter to 10 centimeters thick. In some embodiments the multi-layer coating has a thickness of 2 millimeters, 5 millimeters, 8 millimeters, 10 millimeters, 3 centimeters (1 inch), 5 centimeters (2 inches), 8 centimeters (3 inches), 9 centimeters (3.5 inches), or 10 centimeters (4 inches).

Also disclosed are methods for coating pipes. These methods comprise providing a pipe with an interior surface and an exterior surface, providing a hot melt processable coating material, adding the coating material to a hot melt dispensing apparatus, hot melt coating the coating material onto the exterior surface of the pipe, and cooling the hot melt coating to provide a first coating layer on the pipe. The hot melt processable coating material comprises the hot melt processable siloxane-based elastomeric polymers described above and may also comprise one or more fillers and additives as described above.

In some embodiments, the first layer of coating material may comprise the entire coating, but in other embodiments, subsequent layers may be applied to the first coating layer. These subsequent layers typically are also hot melt processable. In some embodiments, at least one subsequent coating comprises a hot melt processable siloxane-based elastomeric polymer. The coating may also comprise at least one filler or additive.

The coating material can be prepared by hot melt mixing of the hot melt processable siloxane-based elastomeric polymer and any fillers or additives. A variety of hot melt mixing techniques using a variety of hot melt mixing equipment are suitable for preparing the coating material. Both batch and continuous mixing equipment may be used. Examples of batch methods include those using a BRABENDER (e.g. a BRABENDER PREP CENTER, commercially available from C. W. Brabender Instruments, Inc.; South Hackensack, N.J.) or BANBURY internal mixing and roll milling equipment (e.g. equipment available from Farrel Co.; Ansonia, CN). Examples of continuous methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements. A single hot melt mixing apparatus may be used, or a combination of hot melt mixing equipment may be used to prepare the hot melt processable coating materials of this disclosure. In some embodiments, it may be desirable to use more than one piece of hot melt mixing equipment. For example, one extruder, such as, for example, a single screw extruder, can be used to hot melt process the hot melt processable siloxane-based elastomeric polymer. The output of this extruder can be fed into a second extruder, for example, a twin screw extruder for hot melt mixing with, for example, polypropylene or other polymeric material and/or particulate fillers.

The output of the hot melt mixing is coated onto a pipe surface to produce a coated pipe. If a batch apparatus is used, the hot melt blend can be removed from the apparatus and placed in a hot melt coater or extruder and coated onto a pipe. If an extruder is used to prepare the hot melt blend, the blend can be directly extruded onto a pipe to form a coating layer in a continuous forming method. The formed coating can be solidified by allowing the coating to cool or by quenching using both direct methods (e.g. chill rolls or water bath) and indirect methods (e.g. air or gas impingement).

A wide range of processing and coating temperatures may be used to process the hot melt processable siloxane-based elastomeric polymer coatings of this disclosure. The selection of a suitable coating temperature will depend upon a variety of factors such as the composition of the pipe to be coated, the viscosity of the coating material (for example coating material that contains high levels of fillers have higher viscosities), desired coating speed, as well as other factors. The urea-containing hot melt processable siloxane-based elastomeric polymers tend to be less thermally robust than the oxamide-containing hot melt processable siloxane-based elastomeric polymers, so coating materials containing them should be handled with greater caution. Factors such as residence time in the hot melt coating apparatus also needs to be taken into consideration since, for example, if the residence time in an extruder is short, higher temperatures can be tolerated without adverse affecting the polymers. Typically, the coating temperature is greater than 50° C. up to a temperature of 10° C. below the decomposition temperature of the siloxane-based elastomeric polymer.

In yet other embodiments, a layer of the coating material can be cast and permitted to cool to form a film layer. In some embodiments, the film layer is cast and cooled on a carrier sheet such as release liner, in other embodiments the film layer may be cast and cooled without a carrier sheet. The choice of casting with or without a carrier sheet depends upon a variety of factors including film thickness. For example, the film layer may be sufficiently thick that it is handleable as a free standing film or it may be sufficiently thin that it is easier to handle when it is adhered to a carrier sheet. This film layer can then be applied to a pipe and wrapped around the pipe to provide a coating. In order to enhance adhesion to the pipe, the film layer can be heated, the pipe can be heated, or a combination of heating can be used. In this way, the coating can be prepared in one location as a film layer and coated onto the pipe at another location. Additionally, the film layer can be cut to any size and shape desired and can be easily applied to pipes that are already in place in the field.

Examples

Unless otherwise noted, all parts, percentages, ratios, etc. in the Examples and the rest of the specification are by weight. Unless otherwise specified all materials were from J. T. Baker (AVANTOR, Center Valley, Pa.). All glass and aluminum plates used in the examples were used as supplied and had no special surface treatments applied. The steel plates were grit blasted to remove impurities which might be present on the steel surface. They were meant to represent a worst case scenario for adhesion. In actual applications further etching or priming would be usually be done and the anticipated adhesion would be better.

Materials:

| Abbreviation | Description |
| --- | --- |
| PP-1 | Polypropylene homopolymer with melt flow index of 4 g/10 min, (determined at 230° C. and under a load of 2.16 kg) commercially available from LyondellBasell, Greenville, DE under the trade designation "PRO-FAX 6523" |
| PP-2 | A UV and thermally stabilized polypropylene copolymer designed for extrusion with melt flow index of 0.8 g/10 min (determined at 230° C. and under a load of 2.16 kg), commercially available from LyondellBasell, Greenville, DE under the trade designation "MOPLEN COAT EP/60 BIANCO". It is developed for continuous service at high temperature (typically in the −20° C./+120° C. temperature range for on-shore projects and up to +145° C. for off-shore projects). The product offers good resistance to impact, indentation, environmental stress cracking, chemicals, fungi and bacteria, as well as good stiffness and low water absorption. |

-continued

| Abbreviation | Description |
| --- | --- |
| PP-3 | Polypropylene homopolymer with melt flow index of 20 g/10 min (determined at 230° C. and under a load of 2.16 kg), commercially available from LyondellBasell, Greenville, DE under the trade designation of "ADSTIF HA840R". |
| PP-4 | Maleic anhydride modified polypropylene homopolymer with melt flow index of 115 g/10 minutes (determined at 190° C. and under a load of 2.16 kg), commercially available from Chemtura Corporation, Middlebury, CT under the trade designation "POLYBOND 3200" |
| Polyoxamide-1 | Poly(diorganosiloxane)-polyoxamide copolymer made from diamine of 14,000 molecular weight as per "Preparatory Example 1" of US Patent No. 7,947,376. |
| Polyoxamide-2 | Poly(diorganosiloxane)-polyoxamide copolymer made as per "Preparatory Example 1" of US Patent No. 7,947,376 but with a diamine of 25,000 molecular weight. |
| SPU | A thermoplastic silicone elastomer which contains polydimethylsiloxane and urea groups, commercially available under the trade designation "GENIOMER 200" from Wacker Chemical, Adrian, MI. |
| PE | An ethylene-octene copolymer with melt flow index of 30 g/10 minutes (determined at 190° C. and under a load of 2.16 kg) commercially available under the trade designation "ENGAGE 8207" from Dow Chemical, Midland, MI. |
| GB-1 | Glass bubbles commercially available from 3M Company, St. Paul, MN under the trade designation "3M Glass Bubbles iM30K". |
| GB-2 | Glass bubbles commercially available from 3M Company, St. Paul, MN under the trade designation "3M Glass Bubbles S38HS". |
| GB-3 | Glass bubbles commercially available from 3M Company, St. Paul, MN under the trade designation "3M Glass Bubbles XLD 6000". |
| GB-4 | Glass bubbles commercially available from 3M Company, St. Paul, MN under the trade designation "3M Glass Bubbles XLD 3000". |
| GB-5 | Glass bubbles commercially available from 3M Company, St. Paul, MN under the trade designation "3M Glass Bubbles XLD iM17K". |
| Aluminum | 2024-T3 aluminum plates commercially available from Assurance Manufacturing, Inc., Minneapolis, MN. The plates were used as-received, without any surface treatment and cleaning |
| Steel | A-36 steel plates commercially available from Speedy Metals, Inc., Appleton, WI. The plates were grit blasted prior to testing to remove any surface impurities. |
| Glass | Glass plates, commercially available from Sigma-Aldrich Corp., St. Louis, MO, under the trade designation of "CVS10 GLASS PLATE". The plates were used as-received, without any surface treatment and cleaning. |

Test Methods
Relative Adhesion

The relative adhesion was tested by inserting a thin steel plate between the plates and trying to pry the plates apart with a twisting motion. The following rating system was used:
1=easy to separate the plates
3=possible to separate the plates but required effort
9=impossible to separate the plates under the described test condition Thermal Conductivity Thermal conductivity (K-value, W/mK) of the samples was measured using the "LaserComp Fox 50" thermal conductivity measurement system (commercially available from LaserComp, Inc., Saugus, Mass.). The test samples were prepared by compression molding the pellets to form a disk with a diameter 50 mm and a thickness of 6.5 mm. WinTherm50 Version 2.30.01 software program was used with a PERSPEX calibration standard.

Peak Peel Force

The peak peel force was determined by a T-peel test. The tests were performed with a universal testing machine (Model Sintech 1/G—Tensile Tester) equipped with 5 kN load cell and with self-aligning tensile testing grips available from MTS Systems Corporation, Eden Prairie, Minn. 5 cm-long sections of the unbounded ends of the test specimen were bent by approximately 90° and they were clamped to the tensile testing grips. The tensile load was applied at a constant head speed of 50.8 mm/min (2 in/min).

Transmission, Haze, and Clarity (THC)

Haze-Gard Plus, made by BYK Gardner USA, Columbia, Md. was used for THC measurements. A control measurement of the Glass background substrate was taken as a comparison.

Example 1

Samples of PP-1 and Polyoxamide-2 were compounded in a "PRISM TSE 24 MC" co-rotating twin screw extruder (24 mm L/D 28) commercially available from Thermoelectron, Waltham, Mass. The extruder was equipped with water bath and a pelletizer system. The screw configuration had seven zones and a strand die. Zone 1 was water cooled and the temperatures in zone 2 to 7 were set to 180° C., 210° C., 210° C., 210° C., 210° C., 210° C. and 210° C., respectively. The screw speed was 250 rpm. Polyoxamide-2 and PP-1 resin were fed through the feed throat (Zone 1). The extrudate was cooled in a water bath and pelletized. The pellets were further dried at 125° C. for 4 hours in an oven.

The Polyoxamide-2 content was varied from 0% to 100% with 9 total samples being made as indicated in Table 1.

The compounded samples were compression molded in an electrically heated compression molder to produce flat, thin films with a thickness of 300 microns (12 mils). The temperature of the platens of the molder was set to 204° C. (400° F.). The PP-1/Polyoxamide-2 compounds were left on the heated press for 5 minutes dwell time, so that the temperature of the pellets would approximately reach the set temperature of the platens. The films were pressed under a pressure of 1.72 MPa (250 psi). The hot pressed films were immediately quenched in another press, the platens of which were continuously cooled with circulating water at 20° C.

The prepared Polyoxamide-2/PP-1 blend films were placed between two aluminum (Al) plates to form a sandwich structure (Al/polymer/Al). The dimensions of the Al plates were 5 cm×2.5 cm×1 mm. The sandwich structure was then pressed in an electrically heated press. The temperature of the platens of the hot press was set to 204° C. (400° F.). The sandwich structures were left on the heated press for 5 minutes dwell time, so that the temperature of the pellets would approximately reach the set temperature of the platens. The sandwich structures were pressed under a pressure of 1.72 MPa (250 psi). The hot pressed sandwich structures were immediately quenched in another press, the platens of which were continuously cooled with circulating water at ambient temperature.

The resulting adhesion as described under the "relative adhesion" test for the 9 samples is shown in Table 1.

Example 2

Example 1 was repeated with 10 cm×10 cm×0.5 cm steel plates instead of aluminum. The resulting adhesion as described under the "relative adhesion" test for the 9 samples is shown in Table 1.

TABLE 1

| Composition | Relative Adhesion on Al | Relative Adhesion on Steel |
|---|---|---|
| 100% PP-1 | 1 | 1 |
| 98:2 wt % PP-1:Polyoxamide-2 | 1 | 1 |
| 95:5 wt % PP-1:Polyoxamide-2 | 1 | 1 |
| 90:10 wt % PP-1:Polyoxamide-2 | 1 | 1 |
| 80:20 wt % PP-1:Polyoxamide-2 | 1 | 1 |
| 50:50 wt % PP-1:Polyoxamide-2 | 3 | 3 |
| 35:65 wt % PP-1:Polyoxamide-2 | 3 | 3 |
| 15:85 wt % PP-1:Polyoxamide-2 | 3 | 3 |
| 100% Polyoxamide-2 | 9 | 9 |

Example 3

Samples of SPU and PE were compounded on the same extruder described in example 1 but the temperatures in zone 2 to 7 were set to 160° C., 200° C., 200° C., 200° C., 200° C., 200° C. and 200° C., respectively. The screw speed was 250 rpm. SPU and PE resin were fed through the feed throat (Zone 1). The SPU content were varied between 0 and 100 wt % in a total of 5 samples as indicated in Table 2.

The compounded samples were compression molded and tested for relative adhesion on aluminum as described in Example 1 with results as shown in Table 2.

Example 4

Example 3 was repeated (PE and SPU blends) with 10 cm×10 cm×4 mm glass plates instead of the aluminum plates. The hot pressed sandwich structures were left on a laboratory bench to slowly cool at ambient temperature without forced cooling.

The adhesive properties were determined by following the "relative adhesion" test procedure and results are shown in Table 2.

Example 5

Example 3 was repeated (PE and SPU blends) with 10 cm×10 cm×0.5 cm steel plates instead of the aluminum plates. The adhesive properties were determined by following the "relative adhesion" test procedure and results are shown in Table 2.

TABLE 2

| Composition | Relative Adhesion on Al | Relative Adhesion on Glass | Relative Adhesion on Steel |
|---|---|---|---|
| 100% PE | 3 | 1 | 3 |
| PE + 40 wt % SPU | 3 | 3 | 3 |
| PE + 60 wt % SPU | 3 | 3 | 3 |
| PE + 80 wt % SPU | 3 | 3 | 3 |
| 100% SPU | 3 | 9 | 3 |

Example 6

Polyoxamide-1 and 55 volume % GB-1 were compounded in a co-rotating intermeshing 1" twin screw extruder (L/D: 25), commercially available from Thermo-electron, Waltham, Mass., equipped with a side stuffer, water bath and a pelletizer system. The bubbles (GB-1) were introduced using the side stuffer downstream in zone 4 of 7 available heating zones of the extruder. Zone 1 was the Polyoxamide-1 resin feed region and cooled with water. The temperatures in zone 2 to 7 were set to 190° C., 220° C., 220° C., 220° C., 220° C., 220° C. respectively. The die temperature was set to 220° C. The screw rotation speed was set to 350 rpm. Both the main feeder and the side stuffer feeder were volumetric feeders. The extrudate was cooled in a water bath and pelletized.

The compounded samples were compression molded in an electrically heated compression molder to produce flat, thin films. The temperature of the platens of the molder was set to 204° C. (400° F.). The GB-1/Polyoxamide-1 compounds were left on the heated press for 5 minutes dwell time, so that the temperature of the pellets would approximately reach the set temperature of the platens. The films were pressed under a pressure of 1.72 MPa (250 psi). The hot pressed films were immediately quenched in another press, the platens of which were continuously cooled with circulating water at ambient temperature.

The prepared GB-1/Polyoxamide-1 films were put between two substrate plates (steel, aluminum, or glass) to form a sandwich structure (substrate/polymer/substrate). The dimensions of metal plates were 10 cm×10 cm×0.5 cm. The dimensions of glass plates were 10 cm×10 cm×4 mm. The dimensions of Al plates were 5 cm×2.5 cm×1 mm.

The sandwich structure was then pressed in an electrically heated press as in example 1. The hot pressed sandwich structures prepared with aluminum and steel plates were immediately quenched in another press, the platens of which were continuously cooled with circulating water at ambient temperature. The hot pressed sandwich structures prepared with glass plates were left on a laboratory bench to slowly cool at ambient temperature without forced cooling.

The adhesive properties were determined by following the "relative adhesion" test procedure and results are shown in Table 3.

TABLE 3

| Substrate | Relative Adhesion |
|---|---|
| Steel | 9 |
| Aluminum | 9 |
| Glass | 9 |

Example 7

The following experiments were performed with Polyoxamide-2 and SPU with PP-2. Samples were compounded in a twin screw extruder as in Example 1 and the stability of the extrudate was observed and recorded as a function of the composition of the blend.

The observations reported in Table 4 indicate that Polyoxamide-2 is significantly easier to be blended and extruded with PP-2. Although we do not wish to be bound any theory, we anticipated that the significant viscosity mismatch between PP-2 and SPU would make the processing difficult. Note that SPU was observed to be of much lower viscosity than Polyoxamide-2. Note also that PP-2, similar to the majority of the PP grades which are used in oil & gas applications, is of high viscosity (melt flow rate of 0.8 g/10 min, determined at 230° C. and under a load of 2.16 kg).

TABLE 4

Composition of the blend (wt %)

| PP-2 | Polyoxamide-2 | SPU | Observation |
|---|---|---|---|
| 100 | 0 | 0 | stable, continuous extrudate |
| 80 | 20 | 0 | stable, continuous extrudate |
| 60 | 40 | 0 | stable, continuous extrudate |
| 40 | 60 | 0 | stable, continuous extrudate |
| 20 | 80 | 0 | stable, continuous extrudate |
| 0 | 100 | 0 | stable, continuous extrudate |
| 0 | 0 | 100 | stable, continuous extrudate |
| 20 | 0 | 80 | stable, continuous extrudate |
| 40 | 0 | 60 | No continuous extrudate was obtained |
| 60 | 0 | 40 | No continuous extrudate was obtained |
| 80 | 0 | 20 | No continuous extrudate was obtained |

Example 8

The effect of water absorption on the relative adhesion of Polyoxamide-1 and SPU on glass and aluminum substrates was tested.

Polyoxamide-1 pellets were compression molded between two polytetrafluoroethylene sheets in an electrically heated press to obtain flat films of approximate thickness of 625 microns. The temperature of the platens of the hot press was set to 204° C. (400° F.). The pellets were left on the heated press for 5 minutes (dwell time), so that the temperature of the pellets would approximately reach the set temperature of the platens. The films were pressed under a pressure of 1.72 MPa (250 psi). The hot pressed films were immediately quenched in another press, the platens of which were continuously cooled with circulating water at ambient temperature.

SPU pellets were compression molded between two paper backed liners in an electrically heated press to obtain flat films of approximate thickness of 125 microns (5 mils). The temperature of the platens of the hot press was set to 204° C. (400° F.). The films were pressed under a pressure of 1.72 MPa (250 psi). The hot pressed films were immediately quenched in another press, the platens of which were continuously cooled with circulating water at ambient temperature.

The prepared Polyoxamide-1 and SPU films were put between two glass plates to form a sandwich structure (glass/polymer/glass). The dimensions of glass plates were 10 cm×10 cm×4 mm. The sandwich structure was then pressed in an electrically heated press. The temperature of the platens of the hot press was set to 204° C. (400° F.). The sandwich structures were left on the heated press for 5 minutes (dwell time), so that the temperature of the pellets would approximately reach the set temperature of the platens. The sandwich structures were pressed under a pressure of 1.72 MPa (250 psi). The hot pressed sandwich structures were left on a laboratory bench to slowly cool at ambient temperature without forced cooling.

The prepared Polyoxamide-1 films were put between two aluminum (Al) plates to form a sandwich structure (Al/polymer/Al). The dimensions of Al plates were 5 cm×2.5 cm×1 mm. The sandwich structure was then pressed in an electrically heated press. The temperature of the platens of the hot press was set to 204° C. (400° F.). The sandwich structures were left on the heated press for 5 minutes (dwell time), so that the temperature of the pellets would approximately reach the set temperature of the platens. The sandwich structures were pressed under a pressure of 1.72 MPa (250 psi). The hot pressed sandwich structures were immediately quenched in another press, the platens of which were continuously cooled with circulating water at ambient temperature.

The prepared Polyoxamide-1 films and glass/Polyoxamide-1/glass, glass/SPU/glass, and aluminum/Polyoxamide-1/aluminum sandwich structures were immersed in deionized water at 25° C. for 18 days. The weights of the samples were determined before the start of the immersion tests. After 18 days, the samples were taken out of the water bath. The water droplets left on the surface of the samples were wiped off with a paper towel and the final weights of the samples were determined.

As expected from the hydrophobic nature of SPU and Polyoxamide-1, it is determined that the samples did not absorb any measurable water (the weight of the samples were determined with an accuracy of $10^{-4}$ grams).

The adhesion was tested as described in the "relative adhesion" test. It was determined that the immersion of samples in water for 18 days in deionized water at 25° C. did not significantly affect the strength of adhesion, as shown in Table 5.

TABLE 5

| Sample | Relative Adhesion before immersion in water | Relative Adhesion after immersion in water for 18 days |
|---|---|---|
| glass/Polyoxamide-1/glass | 9 | 9 |
| glass/SPU/glass | 9 | 9 |
| aluminum/Polyoxamide-1/aluminum | 9 | 9 |

Example 9A

A study was done to determine the relative adhesion to glass of Polyoxamide-1 or SPU alone without further additives as a function of temperature.

Polyoxamide-1 pellets were compression molded between two polytetrafluoroethylene sheets and in an electrically heated press to obtain flat films of approximate thickness of 0.64 mm (25 mils). The temperature of the platens of the hot press was set to 204° C. (400° F.). The pellets were left on the heated press for 5 minutes dwell time, so that the temperature of the pellets would approximately reach the set temperature of the platens. The films were pressed under a pressure of 1.72 MPa (250 psi). The hot pressed films were immediately quenched in another press, the platens of which were continuously cooled with circulating water at ambient temperature.

SPU pellets were compression molded between two paper backed liners in an electrically heated press to obtain flat films of approximate thickness of 0.13 mm (5 mils). The temperature of the platens of the hot press was set to 204° C. (400° F.). The films were pressed under a pressure of 1.72 MPa (250 psi). The hot pressed films were immediately quenched in another press, the platens of which were continuously cooled with circulating water at ambient temperature.

The prepared Polyoxamide-1 and SPU films were put between two glass plates to form a sandwich structure (glass/polymer/glass). The dimensions of glass plates were 10 cm×10 cm×4 mm. The sandwich structure was then pressed in an electrically heated press. To obtain sandwich structures which were pressed at three different temperatures, temperature of the platens of the hot press was set to 93° C. (200° F.), 149° C. (300° F.), 204° C. (400° F.). The sandwich structures were left on the heated press for 5 minutes dwell time, so that the temperature of the pellets would approximately reach the set temperature of the platens. The sandwich structures were pressed under a pressure of 1.72 MPa (250 psi). The hot pressed sandwich structures were left on a laboratory bench to slowly cool at ambient temperature without forced cooling.

The adhesive properties were determined by following the "relative adhesion" test procedure and results are shown in Table 6.

TABLE 6

| Hot Press Temperature | Polymer type | |
|---|---|---|
| | Polyoxamide-1 | SPU |
| 93° C. (200° F.), | 1 | 1 |
| 149° C. (300° F.), | 9 | 3 |
| 204° C. (400° F.). | 9 | 9 |

Transmission, haze and clarity (THC) were measured for glass/Polyoxamide (or SPU)/glass sandwich structures hot pressed at 204° C. (400° F.) as described under test methods for "Transmission, Haze, and Clarity (THC)" and are reported in Table 7.

TABLE 7

| | | Sandwich Structure | |
|---|---|---|---|
| Property | Glass | Glass/Polyoxamide/Glass | Glass/SPU/Glass |
| Transmission (%) | 80.4 | 85.6 | 86.8 |
| Haze (%) | 4.98 | 9.25 | 5.93 |
| Clarity (%) | 99.4 | 98.1 | 98.1 |

Example 9B

A second study was done to determine the relative adhesion to aluminum of Polyoxamide or SPU as a function of temperature. 3 grams of Polyoxamide or SPU pellets were put between two aluminum (Al) plates to form a sandwich structure (Al/polymer/Al). The plates had the dimensions of 30 cm×10 cm×1 mm. The pellets were placed on one end of the Al plates to obtain a sandwich structure which was bonded only over approximately 10 cm of its length. The sandwich structure was then pressed in an electrically heated press. To obtain sandwich structures which were pressed at four different temperatures, temperature of the platens of the press was set to ambient, 38° C. (100° F.), 149° C. (300° F.), 204° C. (400° F.). The sandwich structures were left on the heated press for 5 minutes (dwell time), so that the temperature of the pellets would approximately reach the set temperature of the platens. The sandwich structures were pressed under a pressure of 1.72 MPa (250 psi). The hot pressed sandwich structures were immediately quenched in another press, the platens of which were continuously cooled with circulating water at ambient temperature. The state of bonding was tested by following the "peak peel force" test procedure and results are shown in Table 8. NA=Sample did not allow recording of any significant force value.

TABLE 8

| Compression Temperature | Peak peel force (N) | |
|---|---|---|
| | Al/Polyoxamide/Al | Al/SPU/Al |
| Ambient | 20 | NA |
| 38° C. (100° F.), | 178 | NA |
| 149° C. (300° F.), | 236 | NA |
| 204° C. (400° F.). | 289 | 27 |

Example 10

Polyoxamide-1 alone or PP-3 pellets alone were compression molded between two polytetrafluoroethylene sheets in an electrically heated press to obtain test samples. The temperature of the platens of the hot press was set to 266° C. (510° F.). The pellets were left on the heated press for 5 minutes dwell time, so that the temperature of the pellets would approximately reach the set temperature of the platens. The films were pressed under a pressure of 1.72 MPa (250 psi). The hot pressed samples were immediately quenched in another press, the platens of which were continuously cooled with circulating water at ambient temperature. The prepared pellets were used to prepare the test samples as described in Example 8. The thermal conductivity was tested per the "Thermal Conductivity" test procedure and values are presented in Table 9.

Example 11

Glass bubble filled (GB-1 or GB-3) Polyoxamide-1 and glass bubble filled (GB-2 or GB-3) PP-3 compositions were prepared in a co-rotating intermeshing 1" twin screw extruder (L/D:25/Thermo Electron Corporation) equipped with a side stuffer, water bath and a pelletizer system. The bubbles were introduced using the side stuffer downstream in zone 4 of 7 available heating zones of the extruder. Zone 1 was the resin (Polyoxamide-1 or PP-3) feed region and cooled with water. The temperatures in zone 2 to 7 were set to 190° C., 220° C., 220° C., 220° C., 220° C., 220° C. respectively. The die temperature was set to 220° C. The screw rotation speed was set to 400 rpm. Both the main feeder and the side stuffer feeder were volumetric feeders. The extrudate was cooled in a water bath and pelletized. The pellets were further dried at 125° C. for 4 hours in an oven.

GB-3/Polyoxamide-1/PP-3, GB-4/Polyoxamide-1/PP-3 and GB-5/Polyoxamide-1/PP-3 compositions were prepared in the same extruder as described above, by using the same set-up, and by using the same process conditions, however side stuffing was not used. The previously prepared glass bubble filled Polyoxamide-1 pellets were dry-mixed with PP-3 pellets and were fed through the hopper (Zone 1).

The prepared pellets were used to prepare the test samples as described in Example 8. The thermal conductivity was tested per the "Thermal Conductivity" test procedure and values are presented in Table 9.

Example 12

In another example, the use of maleic-anhydride grafted polypropylene (PP-4) was demonstrated. The samples were prepared in the same extruder as described above, by using the same set-up, and by using the same process conditions, however side stuffing was not used. The previously prepared GB-5 filled Polyoxamide-1 pellets and PP-4 pellets were dry-mixed with PP-3 pellets and were fed through the hopper (Zone 1).

The obtained pellets were used to prepare the test samples as described in Example 8. The thermal conductivity was tested per the "Thermal Conductivity" test procedure and values are presented in Table 9.

TABLE 9

| Sample | Thermal conductivity (W/mK) at 40° C. |
| --- | --- |
| PP-3 | 0.210 |
| 55 vol % PP-3 + 45 vol % GB-2 | 0.168 |
| 55 vol % PP-3 + 45 vol % GB-3 | 0.150 |
| Polyoxamide-1 | 0.167 |
| 47 vol % Polyoxamide-1 + 53 vol % GB-1 | 0.145 |
| 45 vol % Polyoxamide-1+ 55 vol % GB-3 | 0.125 |
| 55 vol % PP-3 + 20 vol % Polyoxamide-1 + 25 vol % GB-3 | 0.150 |
| 55 vol % PP-3 + 20 vol % Polyoxamide-1 + 25 vol % GB-4 | 0.165 |
| 28 vol % PP-3 + 2 vol % PP-4 + 25 vol % Polyoxamide-1 + 45 vol % GB-5 | 0.154 |

What is claimed is:

1. A coated pipe comprising:
   a pipe comprising an interior surface and an exterior surface; and
   a coating that is hot melt coated directly applied onto the exterior surface of the pipe, the coating comprising:
   a hot melt processable siloxane-based elastomeric polymer, wherein the siloxane-based elastomeric polymer comprises a segmented copolymer containing at least two repeat units of Formula 2:

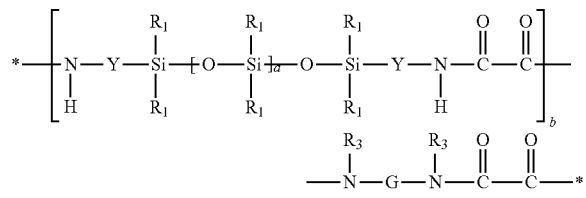

Formula 2 wherein each $R_1$ is independently an alkyl, haloalkyl, aralkyl, alkenyl, aryl, or aryl substituted with an alkyl, alkoxy, or halo;

each Y is independently an alkylene, aralkylene, or a combination thereof;

subscript a is independently an integer of 40 to 1500;

subscript b is an integer of 1 to 10;

G is a divalent group that is the residue unit that is equal to a diamine of formula $R_3HN$-G-$NHR_3$ minus the two $NHR_3$ groups;

each $R_3$ is hydrogen or an alkyl having 1 to 10 carbon atoms, or $R_3$ taken together with G and with the nitrogen to which they are both attached forms a heterocyclic group;

each asterisk (*) indicates a site of attachment of the repeat unit to another group in the copolymer; and wherein the coating is non-tacky and non-adhesive to polar substrates at a temperature of less than 50° C. and is adhesive to polar substrates at a temperature of greater than 50° C. up to a temperature of 10° C. below the decomposition temperature of the siloxane-based elastomeric polymer;

wherein the coating comprises a multi-layer coating, the multi-layer coating comprises a first coating layer in contact with the exterior of the pipe wherein the first coating layer comprises the hot melt processable siloxane-based elastomeric polymer, and at least one additional coating layer in contact with the first coating layer, wherein the at least one additional coating layer comprises a siloxane-based elastomeric polymer and at least one filler material and wherein the first layer has a thickness of 100 micrometers to 1 millimeter and the at least one additional coating or coatings have a thickness of 1 millimeter to 10 centimeters.

2. The coated pipe of claim 1, wherein the coating is substantially free of tackifying resin.

3. The coated pipe of claim 1, wherein the at least one filler material comprises polypropylene, glass bubbles, hollow ceramic microspheres, or a combination thereof.

4. The coated pipe of claim 1, wherein the first coating layer of the multi-layer coating comprises at least one filler material.

5. The coated pipe of claim 4, wherein the at least one filler material comprises polypropylene, glass bubbles, hollow ceramic microspheres, or a combination thereof.

6. The article of claim 1, wherein the coating is optically transparent.

* * * * *

UNITED STATES PATENT AND TRADEMARK OFFICE
CERTIFICATE OF CORRECTION

PATENT NO. : 10,053,598 B2
APPLICATION NO. : 14/408863
DATED : August 21, 2018
INVENTOR(S) : Yalcin et al.

It is certified that error appears in the above-identified patent and that said Letters Patent is hereby corrected as shown below:

In the Specification

Column 5,
Lines 55-56, delete "poloxyyalkylenes" and insert -- polyoxyalkylenes -- therefor.

Column 11,
Line 66, delete "hexafloropropylene" and insert -- hexafluoropropylene -- therefor.

In the Claims

Column 26,
Line 7, delete "NHR$_3$" and insert -- —NHR$_3$ -- therefor.

Signed and Sealed this
Twenty-second Day of January, 2019

Andrei Iancu
*Director of the United States Patent and Trademark Office*